E. E. F. CREIGHTON.
PROTECTION OF TRANSMISSION SYSTEMS.
APPLICATION FILED DEC. 15, 1910.

1,230,681.

Patented June 19, 1917.
2 SHEETS—SHEET 1.

Witnesses:

Inventor
Elmer E. F. Creighton,
by
His Attorney

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTION OF TRANSMISSION SYSTEMS.

1,230,681.  Specification of Letters Patent.  Patented June 19, 1917.

Application filed December 15, 1910. Serial No. 597,405.

*To all whom it may concern:*

Be it known that I, ELMER E. F. CREIGHTON, a citizen of the United States, residing at Schenectady, in the county of Schenectady, State of New York, have invented certain new and useful Improvements in Protection of Transmission Systems, of which the following is a specification.

My invention relates to the protection of transmission systems against prolonged intermittent or arcing grounds and has for its object certain improvements upon the protecting means disclosed in my pending application, Serial No. 492,846, whereby the cost of manufacture and installation of the same is reduced, the operation is improved and the protection afforded by them against surges is more nearly perfect.

In my pending application referred to above, the controlling or ground indicating means consists of a plurality of electromagnets interconnected in operative relation with the control circuits and connected from the transmission system to ground through potential transformers. My present invention is for an improved selective controlling or ground indicating means operating upon the electrostatic unbalancing in the system that occurs when an arcing or intermittent ground exists and for an improved form of grounding mechanism.

Figure 1:
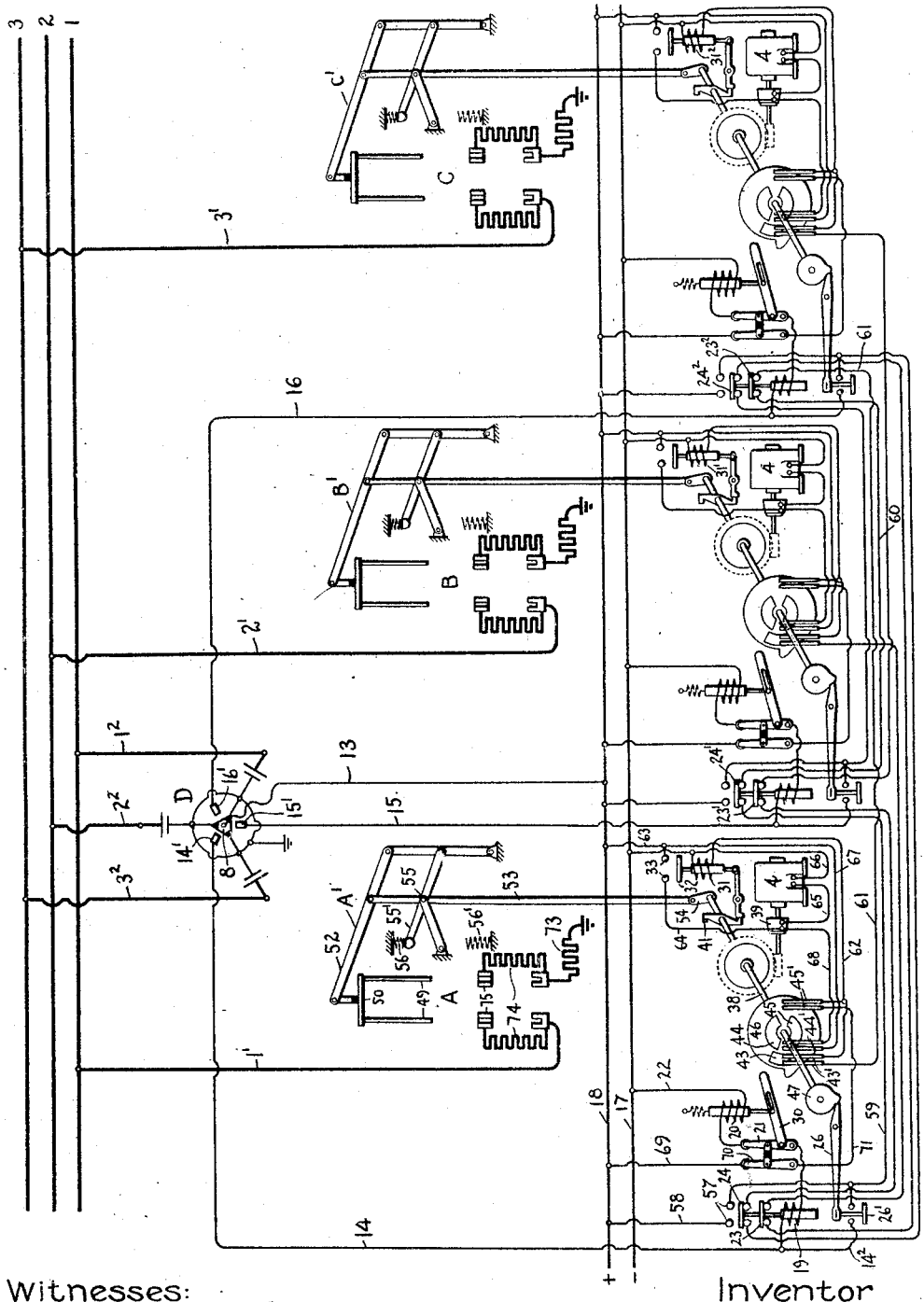

The advantages and novel features of my invention indicated above and others that will hereafter appear will be more particularly pointed out in the appended claims. For a further understanding of my invention, reference may be had to the following drawings where, Figure 1 is a diagrammatic view of a transmission system with my improved protective means in operative relation therewith; and Fig. 2 is a view similar to Fig. 1 of a portion of the protective means on a larger scale.

Referring to the drawings, 1, 2 and 3 are line conductors of a three-phase transmission system, which conductors are connected by means of conductors 1', 2' and 3' to grounding switches A, B and C. Each of these switches is operated by a separate motor 4 through suitable mechanical means and these motors 4 are electro-mechanically interlocked so that no two may operate simultaneously. The first step in the control and operation of motors 4 is under the control of an indicator D which responds to an electrostatic unbalancing of the transmission system. This step I shall now describe in connection with one of the grounding switches, such as A, and its controlling and actuating means. Since the controlling and actuating means for each switch are similar, it will only be necessary to describe the control and operation of A.

Figure 2:
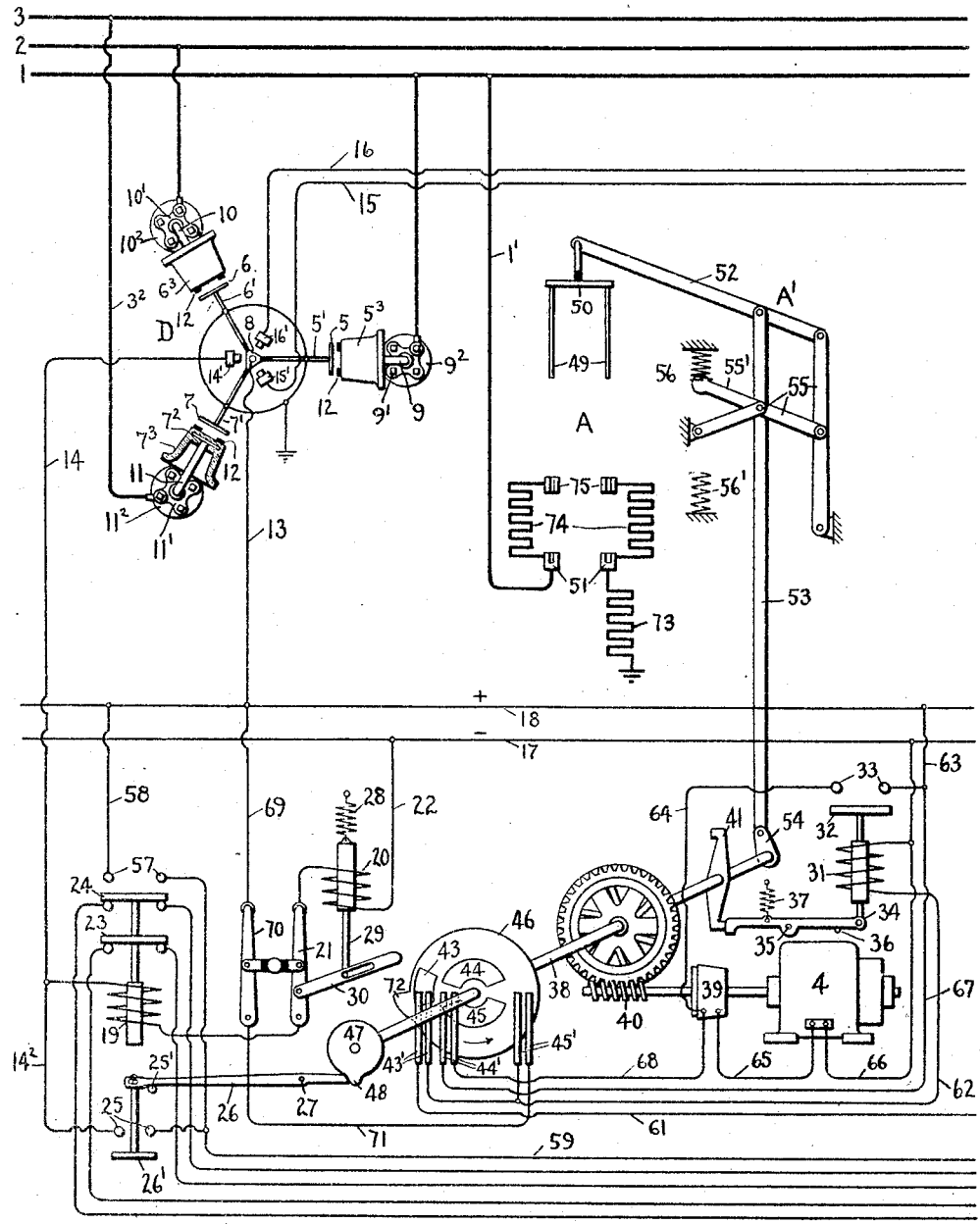

Referring to Fig. 2, the indicator D consists of a movable system of metallic plates, interconnected and grounded, and a fixed system of metallic plates in electrostatic inductive relation with the movable system and electrically connected to the transmission system. The movable system consists of three plates 5, 6 and 7 carried on the outer ends of radial arms 5', 6' and 7', respectively, these arms being rigidly connected and suspended in a horizontal plane for universal movement in any suitable manner, as by a flexible suspension wire, not shown, connected to the central point of member 8. In inductive relation with each movable plate are fixed plates, such as $7^2$, preferably embedded in a suitable insulator, as $7^3$. Each fixed plate is electrically connected to its corresponding line conductor, as plate $7^2$, through a metallic rod 11 and thence to line 3 through conductor $3^2$. The rods 9, 10 and 11 serve as supports for insulators $5^3$, $6^3$ and $7^3$ and are themselves conveniently supported by metallic plates 9', 10' and 11' suitably secured to insulators $9^2$, $10^2$ and $11^2$. 12 are suitable insulating stops which are secured to insulators $5^3$, $6^3$ and $7^3$ in the paths of the movable plates 5, 6 and 7. The member 8, to which are fastened the ends of the movable system of rods 5', 6' and 7', is adapted to close a control circuit between conductor 13 and either one of the conductors 14, 15 and 16, the conductor 13 being electrically connected to member 8 and the conductors 14, 15 and 16 are in electrical connection with contacts 14', 15' and 16', which are in proximity to and in the path of the said part 8. The conductors 13 and 14 are in the control circuit of novel interlocking devices now to be described, the power for actuating these devices being derived from any suitable source, as from conductors 17 and 18. Conductor 14 is in the control circuit of switch A, conductors 15 and 16 being in the control circuits of switches B and C respectively.

Conductor 14 is connected with one end of the coil of electromagnet 19, of which the other end is connected with one end of the coil of another electromagnet 20 through a single pole switch 21, the other end of the latter coil being connected with conductor 17 through conductor 22. To an arm extending upwardly from the armature of electromagnet 19 are secured two contact members 23 and 24, which respectively are adapted to bridge over contacts in the main control circuits of switches B and C, so that, when electromagnet 19 picks up its armature to set in operation the motor 4 to actuate the switch A, as will hereafter be explained, the motors for actuating switches B and C will be prevented from operating. These members or interlocks 23 and 24, which are shown diagrammatically, may be, as usual, preferably yieldingly mounted on the armature of electromagnet 19.

A lever 26, pivoted at 27 and carrying at one end a contact member 26', is provided for closing contacts 25 at a predetermined time, as will hereinafter appear, and a stop 25' is also provided for limiting the downward movement of the longer end of lever 26. The armature of magnet 20 is normally held up by a spring 28 and at its lower end carries a downwardly projecting arm 29. This arm carries at its lower end a finger which passes through a slot in a "kickout" arm 30, this arm 30 being pivoted at one end to switch blade 21.

An electromagnet 31 is in the main control circuit which will be hereinafter described. The armature of this magnet 31 carries at its upper end a contact member 32 for closing contacts 33 when the armature is picked up and at its lower end is in pivotal relation with one arm of a lever 34, pivoted at 35. In operative relation with this lever 34 is a stop 36 to limit the downward movement of its pivoted end and on the other side of pivot 35 is a spring 37 for normally holding the lever in a substantially horizontal position, as shown.

The motor 4 drives a main shaft 38 through an electromagnetic clutch 39 and a worm gear 40. This shaft has an arm 41 rigidly attached thereto, which is normally restrained from rotation in a counter-clockwise direction by means of the free end of lever 34 which is in its path, the shaft being restrained from clockwise rotation, as will be hereinafter explained. This shaft also carries suitable contact bridges 43, 44 and 45, which may be conveniently mounted on a disk 46, these bridges being so positioned as to bridge contacts 43', 44' and 45' at predetermined periods. A disk 47 having a cam 48 which comes into engaging relation with the free end of lever 26 at each revolution is also mounted upon the shaft 38 for a purpose which will be hereinafter explained.

The grounding switch proper A' is of a well known type, having two blades 49 bridged over at their upper ends by a conducting crosspiece 50 and two switch contacts 51 for the reception of blades 49 in the closed position. The blades 49 are actuated by means of a lever 52 in pivotal relation therewith and a rod 53 connected to the shaft 38 through a crank arm 54. Lever 52 and rod 53 are guided in their movements by means of a system of toggle levers 55. One lever 55' of this system is adapted to engage with springs 56 and 56' respectively at the upper and lower limits in the movements of switch blades 49, so that a quick break and an initial movement may be obtained independently of the driving motor 4. These springs also have a cushioning effect upon the operation of the switch. It should be observed that the crank arm 54 is so positioned that the tendency of spring 56 is to turn the shaft 38 in a counter-clockwise direction, and rotation in a clockwise direction is thereby obviated.

The operation of this device is as follows: Assuming that phase 1 of the transmission system is intermittently grounded, the lessened pull due thereto between the movable plate 5 and its corresponding fixed plate $5^2$, not shown, which is connected to this phase, will result in a movement toward the left of the sensitively suspended system of movable plates and thereby make contact between 8 and 14'. Current will now flow from the positive conductor 18 through conductor 13, contacts 8 and 14', conductor 14, the coil of electromagnet 19, switch 21, the coil of electromagnet 20, and thence through conductor 22 to the negative line 17. The armature of electromagnet 19 is lifted and lifts members 23 and 24 from their respective contacts which are respectively in the control circuits of switches B and C, thereby preventing a simultaneous operation of two switches. Member 24, however, now closes contacts 57, which are in the circuit of electromagnet 31, and current will flow from line 18 through conductor 58, contacts 57, conductor 59, contact member 24' (see Fig. 1), conductor 60, contact member $23^2$, conductor 61, contacts 43', conductor 62, the coil of electromagnet 31, and thence to the negative line 17, thereby energizing electromagnet 31.

The armature of this magnet 31 now picks up and closes contacts 33 in the circuit of motor 4, which circuit consists of conductor 63, contacts 33, conductor 64, magnetic clutch 39, conductor 65, motor 4 and thence through conductor 66 to negative line 17. At the same time the armature lifts lever 34 against spring 37, thereby disengaging arm 41 and unlocking shaft 38. The motor 4 and later spring 56 now operate to rotate shaft 38 in a counter-clockwise direction. After a fraction of a turn of shaft 38, bridge 43 slips from under contacts 43', thereby breaking the circuit through electromagnet 31 and allowing its armature to drop and break the circuit through contacts 33. By the time this circuit through contacts 33 is broken, however, another circuit through motor 4 is made through conductor 63, conductor 67, contacts 44' and bridge 44, conductor 68, clutch 39, conductor 65, motor 4 and conductor 66 to line 17, the operation of the motor thereby being made continuous. When the shaft 38 makes about half a revolution, the operation of switch A' grounds phase 1, thereby shunting out the intermittent ground upon this phase, and bridge 43 now bridges contacts 45', thereby reënergizing electromagnet 31 through a circuit which consists of conductor 69, a switch 70, pivotally connected by an insulated member to switch 21, conductor 71, contacts 45', conductor 62, and thence through the coil of electromagnet 31 to line 17. The armature of this coil again lifts up the lever 34 against spring 37, thereby allowing the arm 41 to pass as at the beginning of the operation, and also closes contacts 33 in the circuit of motor 4, so that there is no break in the motor circuit while contacts 44' are passing from bridge 44 to bridge 45. Therefore the rotation continues, switch A' is opened, and bridge 43 passes from under contacts 45', breaking the circuit through coil 31, thereby allowing its armature to drop back in a normal locking position, as shown in the figure.

If phase 1 is still grounded after switch A' opens, the electromagnets 19 and 20 remain energized as in the first instance and the armature of coil 20 is pulled downwardly against spring 28, carrying with it the "kick-out" arm 30 to a substantially horizontal position. The motor 4 will continue to revolve as described above. At the completion of one revolution of disk 46, a cam 72 on this disk, provided for the purpose, comes into engagement with the free end of arm 30 which is now in its path and kicks out both switches 21 and 70, thereby deënergizing coils 19 and 20 and opening the two circuits through electromagnet 31, which circuits are completed through contacts 57 and switch 70.

At the end of this revolution, however, the cam 48 on disk 47 comes into engagement with the free end of lever 26 and thereby lifts the member 26' so as to complete a circuit through the coil of electromagnet 31, consisting of conductor 13, contacts 8 and 14', conductor 14, conductor 14², contacts 25, conductor 59, contact 24', conductor 60, contact member 23², conductor 61, contacts 43', conductor 62, and thence through coil 31 to line 17. This energizing of electromagnet 31 results in the unlocking again of arm 41 and the closing of the circuit of the motor 4, as indicated above, until this circuit is completed again through bridge 44 and contacts 44'. The operation is now as before until the end of another half revolution, when the switch A' is permanently closed as a result of the engagement of arm 41 with the free end of lever 34 and the impossibility of completing another circuit through coil 31. It will be noted that the actions which I have described will occur after predetermined periods of time.

If, however, at the end of the first revolution of shaft 38, the intermittent or arcing ground, or dead ground, on phase 1 does not exist any more, as having been suppressed, or shunted out, by switch A' at the end of the first half revolution, the electromagnet 20 will be deënergized, since its circuit is open through the contacts 8 and 14' of indicator D, and the "kick-out" arm 30 will therefore be out of the path of cam 72 on disk 46, as shown in the drawings, and the shaft will be locked in the position shown, the interlocking devices and actuating mechanism being now ready for another complete operation. It may be noted, therefore, that if no ground exists on phase 1, or the circuit through contacts 8 and 14' is broken, at the time cam 48 on disk 47 disengages from lever 26, the switch A' will be locked, and conductor 1 will be permanently grounded. It will be obvious that, if conductors 2 or 3 became grounded, switches B and C will operate in a manner similar to that described for the operation of switch A.

If grounds on two different phases should occur simultaneously, the control circuit of one of these phases would be closed before that of the other, and, as has been experimentally determined, this difference in closing time is sufficient to set one switch in operation before the control circuit of the second phase is completed, and in fact the contacts 14', 15' and 16' may be so arranged that neither pair may be closed simultaneously.

In my pending application referred to above, I show fuses connected between the phases and the ground so as to protect the system against abnormal current flow which might occur under certain conditions, but in the present application I prefer to use resistances 73 to limit the current to a predetermined volume when a switch is closed and also other resistances 74, higher than the first, to be temporarily in circuit but subsequently shortcircuited to prevent a too abrupt change in the static conditions on the transmission system upon the operation of the grounding switches. The resistances 74 have suitable contacts 75 for the reception of switch blades 49 before these blades reach the contacts 51 in the closing operation and are electrically connected also to the latter.

It is understood that the switches A', B' and C' may be, if desired, oil insulated, or may be otherwise constructed to conform to the requisites of the particular installation.

While I have described a preferred embodiment of my invention, I do not limit myself to this embodiment but seek in the appended claims to cover all embodiments which shall be obvious to those skilled in the art and not depart from the spirit of my invention.

What I claim as new, and desire to secure by Letters Patent of the United States, is,—

1. In combination, an electric transmission system, means operative upon an arcing ground upon said system, a motor set into operation by said means, a switch actuated by said motor for grounding said system, a resistance in series with said switch, control circuits for said motor, and means in operative relation with said circuits causing said motor to close said switch momentarily through a comparatively high resistance, then short circuiting a greater portion of said resistance for a predetermined time, opening said switch, and finally closing said switch through the smaller portion of said resistance if the arcing ground still exists.

2. In combination, an electric motor, a driving shaft in operative relation therewith, a switch actuated by said shaft, control circuits for said motor, and means in operative relation with said circuits causing said motor to close said switch, open it, and permanently reclose it after a predetermined period.

3. In combination, an electric motor, a driving shaft in operative relation therewith, a switch actuated by said shaft, control circuits for said motor, means in operative relation with said circuits causing said motor to close said switch, open it and reclose it, and means to prevent the motor from reopening the switch.

4. In combination, an electric motor, a driving shaft in operative relation therewith, a switch actuated by said shaft, control circuits for said motor, electromagnets having contacts in said circuits, means for operating said magnets, stationary contacts, movable contacts in operative relation therewith actuated by said shaft causing said motor to close said switch open it and permanently reclose it.

5. In combination, an electric motor, a driving shaft, an electromagnetic clutch in operative relation with said shaft and said motor, a switch actuated by said shaft, control circuits for said motor and said clutch, electromagnets having contacts in said circuits, means for operating said magnets, stationary contacts, movable contacts in operative relation therewith actuated by said shaft causing said motor to close said switch open it and reclose it, and means preventing said motor from reopening said switch.

6. In combination, a plurality of electric motors, an equal number of driving shafts, electromagnetic clutches between each shaft and each motor, a switch actuated by each of said shafts, control circuits for each motor and its clutch, electromagnets having contacts in each of said circuits, means for operating said magnets, stationary contacts in each circuit, movable contacts in operative relation with the stationary contacts actuated by said shafts causing said motors each to actuate its own driving shaft close the switch actuated thereby open it and reclose it, and means dependent upon the operation of said magnets preventing the simultaneous operation of any two motors.

7. In combination, an electric conductor, an electric motor, a driving shaft in operative relation therewith, a switch for grounding said conductor actuated by said shaft, control circuits for said motor, means actuated by a grounding of said conductor, and means in operative relation with the first means and the control circuits causing the motor to close said switch open it and permanently reclose it after a predetermined period.

8. In combination, an electric conductor, an electric motor, a driving shaft in operative relation therewith, a switch for grounding said conductor actuated by said shaft, control circuits for said motor, electromagnets having contacts in said circuits, means actuated by a grounding of said conductor actuating said magnets, stationary contacts, movable contacts in operative relation therewith actuated by said shaft causing said motor to close said switch open it and permanently reclose it.

9. In combination, a polyphase transmission system comprising a plurality of conductors, a plurality of electric motors, an equal number of driving shafts, electromagnetic clutches each in operative relation with a shaft and a motor, a switch for grounding a conductor of said system actuated by each of said shafts, control circuits for each motor and its clutch, electromagnets in each of said circuits, means actuated by the grounding of a conductor for operating said magnets, stationary contacts in each circuit, movable contacts in operative relation with the stationary contacts actuated by said shafts causing said motors each to actuate its driving shaft close the switch actuated thereby open it and reclose it, and means dependent upon the operation of said magnets preventing the simultaneous operation of any two motors.

10. In combination, an electric transmission system comprising a plurality of conductors, a plurality of electric motors, a driving shaft in operative relation with each motor, a switch for grounding a conductor of said system actuated by each shaft, control circuits for each motor, means responsive to a ground upon a conductor of said system in operative relation with said circuits causing a motor to close the switch grounding said conductor, and means in operative relation with the control circuits of the other motors preventing the simultaneous operation of any two motors.

In witness whereof, I have hereunto set my hand this 13th day of December, 1910.

ELMER E. F. CREIGHTON.

Witnesses:
BENJAMIN B. HULL,
HELEN ORFORD.

Copies of this patent may be obtained for five cents each, by addressing the "Commissioner of Patents, Washington, D. C."